US010974407B2

(12) United States Patent
Mossberg et al.

(10) Patent No.: US 10,974,407 B2
(45) Date of Patent: Apr. 13, 2021

(54) FILLING MACHINE AND A METHOD FOR FILLING A PACKAGE OF A WEB OF PACKAGING MATERIAL WITH A FOOD PRODUCT

(71) Applicant: Tetra Laval Holdings & Finance S.A., Pully (CH)

(72) Inventors: Ulf Mossberg, Löddeköpinge (SE); Tobias Wegbrant, Malmö (SE); Jimmy Liljenberg, Skurup (SE); Göran Hermodsson, Staffanstorp (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 104 days.

(21) Appl. No.: 16/060,973

(22) PCT Filed: Jan. 17, 2017

(86) PCT No.: PCT/EP2017/050867
§ 371 (c)(1),
(2) Date: Jun. 11, 2018

(87) PCT Pub. No.: WO2017/125377
PCT Pub. Date: Jul. 27, 2017

(65) Prior Publication Data
US 2018/0361605 A1 Dec. 20, 2018

(30) Foreign Application Priority Data

Jan. 18, 2016 (SE) ........................................ 1650055

(51) Int. Cl.
*B26D 1/36* (2006.01)
*B26D 1/62* (2006.01)
(Continued)

(52) U.S. Cl.
CPC ............. *B26D 1/365* (2013.01); *B26D 1/626* (2013.01); *B26D 5/32* (2013.01); *B26D 5/34* (2013.01);
(Continued)

(58) Field of Classification Search
CPC .. B65B 61/08; B26D 5/36; B26D 5/30; B26D 5/32; B26D 1/626; B29C 66/306; B29C 66/0326; B31B 50/16; B31B 50/146
(Continued)

(56) References Cited

U.S. PATENT DOCUMENTS 3,016,137 A 1/1962 Pollock
3,237,973 A * 3/1966 Rumberger ............. B65B 41/18
283/62
(Continued)

FOREIGN PATENT DOCUMENTS

CN 101115661 A 1/2008
CN 102448835 5/2012
(Continued)

OTHER PUBLICATIONS

International Search Report from corresponding PCT Application No. PCT/EP2017/050867 dated Apr. 4, 2017 (3 pages).
(Continued)

*Primary Examiner* — Valentin Neacsu
(74) *Attorney, Agent, or Firm* — Finnegan Henderson, Farabow, Garrett & Dunner LLP

(57) ABSTRACT

The disclosure relates to a filling machine (1) for filling a package (2) of a web of packaging material with a food product. The filling machine (1) comprises a jaw system (3) adapted to seal the package (2) after being filled with the food product. The jaw system (3) is equipped with means (4) for providing a unique mark (5) on the package (2). The filling machine (1) further comprises a sensor (7) arranged
(Continued)

downstream of the jaw system (3) which is adapted to detect the mark (5) on the package (2), and a cutting knife (8) adapted to cut the package (2) from the web of packaging material. The cutting knife (8) is movably arranged in the filling machine (1), such that the cutting knife (8) can be adjusted in relation to the package (2) based on the detected mark (5) before cutting the package (2) from the web of packaging material. The disclosure also relates to a method for filling a package (2) of a web of packaging material with a food product.

9 Claims, 3 Drawing Sheets

(51) Int. Cl.

| | | |
|---|---|---|
| *B26D 5/32* | (2006.01) | |
| *B26D 5/34* | (2006.01) | |
| *B26D 5/36* | (2006.01) | |
| *B29C 65/00* | (2006.01) | |
| *B29C 65/74* | (2006.01) | |
| *B29C 65/78* | (2006.01) | |
| *B65B 41/18* | (2006.01) | |
| *B65B 51/30* | (2006.01) | |
| *B65B 57/02* | (2006.01) | |
| *B65B 61/08* | (2006.01) | |
| *B29L 31/00* | (2006.01) | |
| *B26D 1/00* | (2006.01) | |

(52) U.S. Cl.
CPC .............. *B26D 5/36* (2013.01); *B29C 65/745* (2013.01); *B29C 65/7817* (2013.01); *B29C 65/7894* (2013.01); *B29C 66/0326* (2013.01); *B29C 66/1122* (2013.01); *B29C 66/306* (2013.01); *B29C 66/4312* (2013.01); *B29C 66/83521* (2013.01); *B29C 66/849* (2013.01); *B65B 41/18* (2013.01); *B65B 51/306* (2013.01); *B65B 57/02* (2013.01); *B65B 61/08* (2013.01); *B26D 2001/0066* (2013.01); *B29C 66/71* (2013.01); *B29C 66/72321* (2013.01); *B29C 66/72328* (2013.01); *B29C 66/73921* (2013.01); *B29C 66/8412* (2013.01); *B29C 2793/009* (2013.01); *B29L 2031/7128* (2013.01)

(58) Field of Classification Search
USPC ............ 53/551, 51, 554, 52, 64; 83/76, 311; 493/22; 226/2, 452
See application file for complete search history.

(56) References Cited

U.S. PATENT DOCUMENTS

| | | | | |
|---|---|---|---|---|
| 3,703,841 A * | 11/1972 | Crawford | ............. | B26D 1/0006 83/341 |
| 4,387,614 A * | 6/1983 | Evans | ............. | B26D 5/34 83/288 |
| 4,951,444 A * | 8/1990 | Epstein | ............. | B29C 51/46 53/433 |
| 5,000,725 A * | 3/1991 | Bauknecht | ............. | B26D 5/00 226/32 |
| 5,347,791 A * | 9/1994 | Ginzl | ............. | B65B 9/067 53/450 |
| 5,458,062 A * | 10/1995 | Goldberg | ............. | B65H 23/046 101/226 |
| 5,957,821 A * | 9/1999 | Scharbrodt | ............. | B65B 41/18 493/11 |
| 6,106,448 A * | 8/2000 | Obara | ............. | B31B 50/00 493/11 |
| 6,260,336 B1 * | 7/2001 | Motomura | ............. | B29C 65/3656 53/551 |
| 6,781,339 B1 * | 8/2004 | Ikeguchi | ............. | B26D 1/626 318/569 |
| 7,047,883 B2 * | 5/2006 | Raksha | ............. | B05D 3/207 101/489 |
| 7,163,287 B2 * | 1/2007 | Silverbrook | ............. | B41J 2/14427 347/104 |
| 7,681,830 B2 * | 3/2010 | Tsuruta | ............. | B65B 9/20 242/554.3 |
| 7,765,773 B2 * | 8/2010 | Nilsson | ............. | B65H 29/62 53/396 |
| 9,238,535 B2 * | 1/2016 | Nilsson | ............. | B65D 65/38 |
| 2001/0009089 A1 * | 7/2001 | Todd | ............. | B29C 65/18 53/64 |
| 2007/0018004 A1 * | 1/2007 | Gurovich | ............. | G06K 7/084 235/493 |
| 2008/0022872 A1 * | 1/2008 | Nanisetty | ............. | B26D 5/20 101/226 |
| 2008/0245034 A1 * | 10/2008 | Topfer | ............. | A22C 11/0272 53/411 |
| 2009/0000250 A1 * | 1/2009 | Nilsson | ............. | B65H 29/62 53/396 |
| 2009/0195386 A1 * | 8/2009 | Peter | ............. | G08B 13/2408 340/572.1 |
| 2010/0139216 A1 * | 6/2010 | Johansson | ............. | B32B 27/20 53/450 |
| 2012/0067953 A1 * | 3/2012 | Nilsson | ............. | B31B 50/00 235/449 |
| 2012/0070633 A1 * | 3/2012 | Nilsson | ............. | B65B 61/02 428/195.1 |
| 2012/0070634 A1 * | 3/2012 | Holmstrom | ............. | G01B 7/003 428/195.1 |
| 2012/0070638 A1 * | 3/2012 | Nilsson | ............. | B65D 65/38 428/206 |
| 2012/0073242 A1 * | 3/2012 | Nilsson | ............. | B65D 5/4216 53/64 |
| 2012/0074234 A1 * | 3/2012 | Nilsson | ............. | B65D 5/4216 235/493 |
| 2012/0076995 A1 * | 3/2012 | Nilsson | ............. | B32B 15/12 428/195.1 |
| 2012/0077001 A1 * | 3/2012 | Klint | ............. | C09C 1/24 428/208 |
| 2013/0228614 A1 * | 9/2013 | Bergholtz | ............. | B31B 50/88 229/100 |
| 2014/0100098 A1 * | 4/2014 | Dahl | ............. | B65H 43/08 493/11 |
| 2014/0274629 A1 * | 9/2014 | Lykowski | ............. | B65B 41/16 493/17 |
| 2015/0239595 A1 * | 8/2015 | Lopez | ............. | B65B 57/04 53/65 |
| 2017/0297760 A1 * | 10/2017 | Nilsson | ............. | B65D 65/38 |

FOREIGN PATENT DOCUMENTS

| | | | |
|---|---|---|---|
| EP | 0 847 826 | A1 | 6/1998 |
| EP | 0 999 141 | A2 | 5/2000 |
| EP | 2 910 473 | A1 | 8/2015 |

OTHER PUBLICATIONS

Office Action from corresponding Swedish Application No. 1650055-5 dated Jul. 27, 2016 (16 pages).

* cited by examiner

FILLING MACHINE AND A METHOD FOR FILLING A PACKAGE OF A WEB OF PACKAGING MATERIAL WITH A FOOD PRODUCT

CROSS-REFERENCE TO RELATED PATENT APPLICATIONS

This is a National Phase of International Application No. PCT/EP2017/050867, filed Jan. 17, 2017, which claims the benefit of Swedish Application No. 1650055-5 filed Jan. 18, 2016. The entire contents of the above-referenced applications are expressly incorporated herein by reference.

TECHNICAL FIELD

The invention relates to a filling machine and a method for filling a package of a web of packaging material with a food product.

BACKGROUND ART

In filling machines for liquid food packages, such as e.g. sold by Tetra Pak under the name Tetra Pak A1, a web of packaging material is sterilized, and is subsequently formed into a tube by making the longitudinal edges of the web overlap each other and sealing the overlap area. This tube is filled with liquid food continually, and the tube of packaging material is transversally sealed and cut such that separate packages with liquid food are formed.

The transversally seal procedure is typically carried out by a sealing jaw arrangement. The sealing jaw arrangement often comprises a pressure jaw assembly and a heating jaw assembly, wherein the portion of the tube subject to receive a transversal seal is arranged in between the pressure jaw assembly and heating jaw assembly during the formation of the seal. The pressure jaw assembly is arranged to provide means for allowing the sealing jaw arrangement to press the packaging material of the tube during the formation of the seal, and the heating jaw assembly is arranged to provide sufficient heat to the packaging material of the tube needed for the formation of the seal.

After the transversal seal the packaging material of the tube is cut by means of a cutting device in order to create a package. A problem that might arise during the cutting process is that the packaging material may vary a bit in size and shape due to filling variations and due to design corrections performed by the jaw system. Such variations will complicate the cutting process and impair the precision of the cut.

SUMMARY OF THE INVENTION

It is an object of the present invention to mitigate, alleviate or eliminate one or more of the above-identified deficiencies in the art and disadvantages singly or in any combination and solve at least the above mentioned problem.

According to a first aspect, these and other objects are achieved in full, or at least in part, by a filling machine for filling a package of a web of packaging material with a food product. The filling machine comprises a jaw system adapted to seal the package after being filled with the food product. The jaw system is equipped with means for providing a unique mark on the package. The filling machine further comprises a sensor arranged downstream of the jaw system and adapted to detect the mark on the package, and a cutting knife arranged downstream of said sensor and adapted to cut the package from the web of packaging material. The cutting knife is movably arranged in the filling machine, such that the cutting knife can be adjusted in relation to the package based on the detected mark before cutting the package from the web of packaging material. This way, the precision of the cut will be increased and in turn it will be possible to increase the feeding speed of the web of packaging material through the filling machine. Also, due to the precision of the cut, the usage of packaging material will be reduced since only one sealing is needed unlike with the conventional cutting devices where the cut is made between two individual sealings.

The means for providing the unique mark on the package may comprise a magnet such as Neodymium based magnet (e.g. NdFeB) or Samarium based magnet (e.g. Sm2Co17). Further, the unique mark may be created on the package by means of magnetisable paint or printed thereon. This is a simple yet efficient example of the present disclosure.

In order for the overall process of sealing and cutting the package to be as accurate as possible, the means for providing the unique mark on the package may be provided on a jaw of said jaw system.

The filling machine may further comprise a control unit connected to the sensor and to the cutting knife or a movable part of the filling machine to which the cutting knife is attached. The control unit is then used to control the adjustment of the cutting knife based on information received from the sensor. Basically, the following cutting process may be performed for each package. The sensor reads the unique mark on the package and sends that information to the control unit. The control unit calculates the positioning of the package based on the information received from the sensor and in turn sends instructions to the cutting knife or (if any) the means for adjusting the cutting knife which performs the adjustment in relation to the specific package. In one example, the cutting knife is arranged on a movable part in the filling machine. The movable part is movable in a first direction for cutting the package from the web of packaging material and in a second direction for adjusting in relation to said package.

The filling machine may further comprise a gear wheel connected to said cutting knife for adjustment of the same. The gear wheel may in turn be a servo drive also comprised by the filling machine. This is a simple and effective way for making the adjustment of the cutting knife completely automated.

In another example, the filling machine may further comprise a cutting unit. The cutting unit has a first gear wheel and a second gear wheel arranged opposite to the first gear wheel. The cutting knife is connected to the first gear wheel and an anvil is connected to the second gear wheel. Also here, the filling machine further comprises a drive, such as a servo drive, which is connected to the first gear wheel and the second gear wheel in order to control the movements of the same.

According to a second aspect, the objects are achieved in full, or at least in part, by a method for filling a package of a web of packaging material with a food product. The method comprises the steps of sealing the package after being filled with the food product by means of a jaw system, providing a unique mark on the package in the jaw system, detecting the mark downstream of the jaw system, if necessary, adjusting a cutting knife in relation to the package based on said detected mark, and cutting the package from the web of packaging material.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

BRIEF DESCRIPTION OF THE DRAWINGS

The above objects, as well as additional objects, features and advantages of the present disclosure, will be more fully appreciated by reference to the following illustrative and non-limiting detailed description of preferred examples of the present disclosure, when taken in conjunction with the accompanying drawings, wherein.

DETAILED DESCRIPTION

Figure 1:
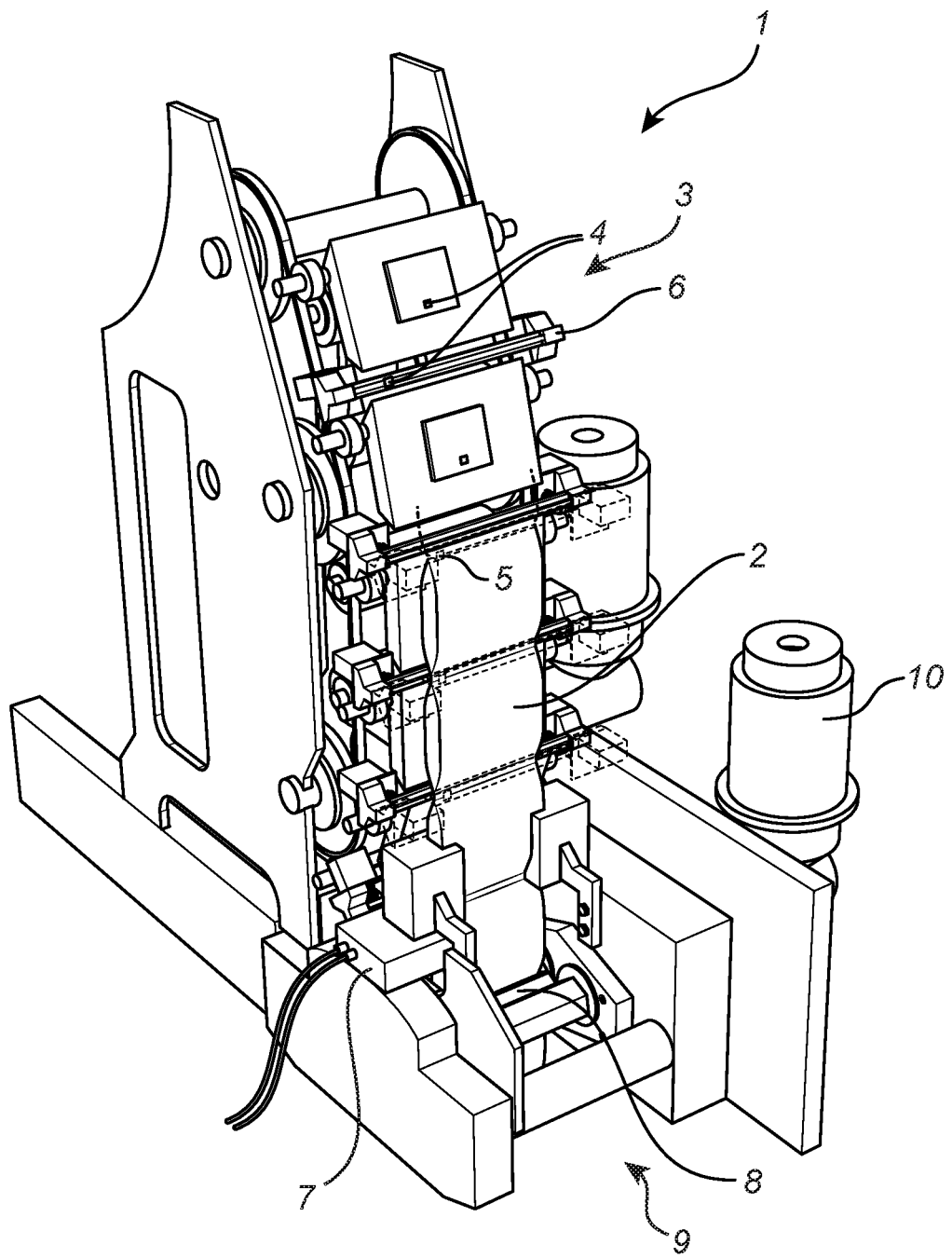
FIG. 1 is a perspective view of a filling machine according to one example of the disclosure.

FIG. 1 illustrates a filling machine 1 for filling a package 2 of a web of packaging material with a food product according to one possible example of the disclosure. The filling machine 1 comprises a jaw system 3 (only partly illustrated) for sealing the package 2 after being filled with the food product. The jaw system 3 is equipped with means 4 for providing a unique mark 5 on the package 2. In this example, that means 4 is provided one of the jaws 6 in the jaw system 3 and comprises a magnet. The filling machine 1 further comprises a sensor 7 which is arranged downstream the said jaw system 3 and which is adapted to detect the mark 5 provided on the package 2 in the jaw system 3, and a cutting knife 8 used to cut the package 2 from the web of packaging material downstream of the jaw system 3 and the sensor 7. The cutting knife 8 is movably arranged in the filling machine 1 in such a way that it can be adjusted in relation to the package 2. The adjustment of the cutting knife 8 is based on the detected mark 5 and is performed just before cutting the package 2 from said web of packaging material.

In an example of the disclosure, the unique mark 5 is provided on the package 2 using so-called information carrier technology. When the package material is manufactured, in the converting factory, a magnetisable ink is printed on the board. The magnetisable ink is not visible but can be magnetised, for example through a permanent magnet, to create a unique mark 5 on the packaging material to track a specific feature. In this case, the magnetisable ink is magnetised by means of a magnet 4 present in the jaw 6 in order to create a unique mark 5 in the area where the package 2 is to be cut.

In an example, the filling machine 1 further comprises a control unit (not shown) which is connected to the sensor 7 and to the cutting knife 8. The control unit 8 is adapted to adjust the cutting knife 8 based on information received from the sensor 7.

Figure 2:
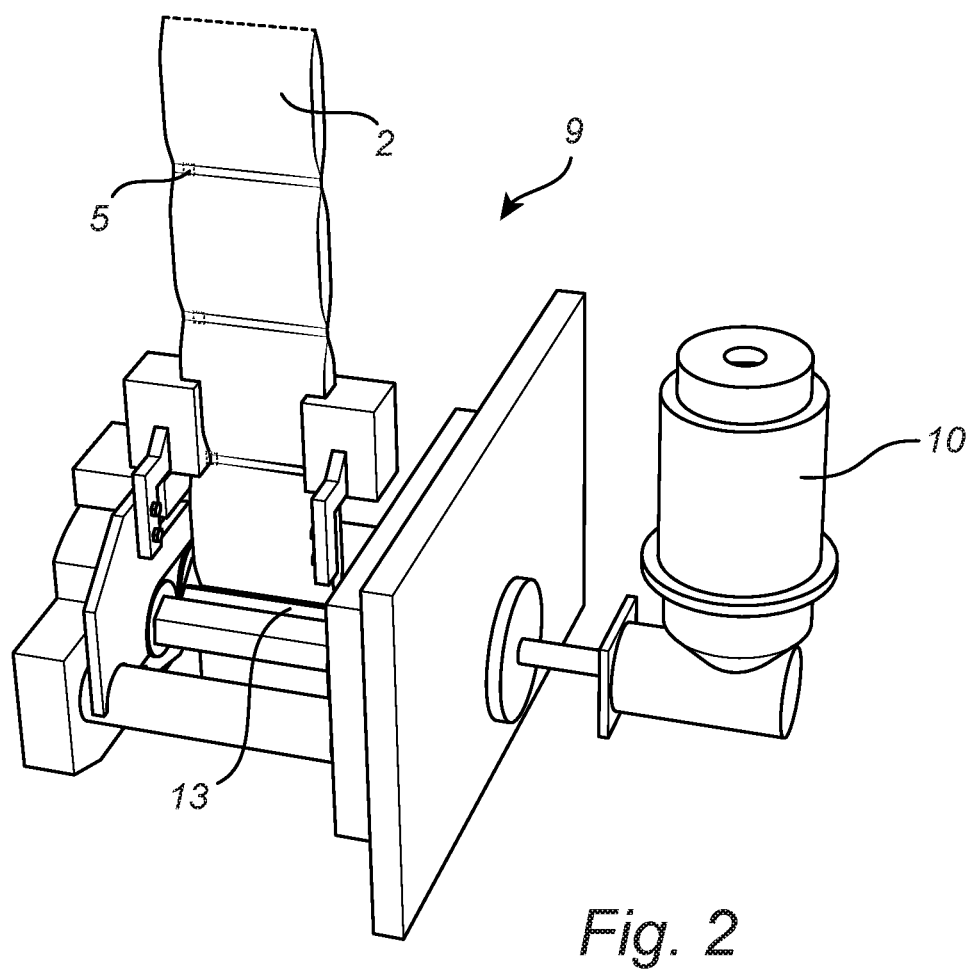
FIG. 2 is a perspective view of a cutting unit and a servo drive of the filling machine.
Figure 3:
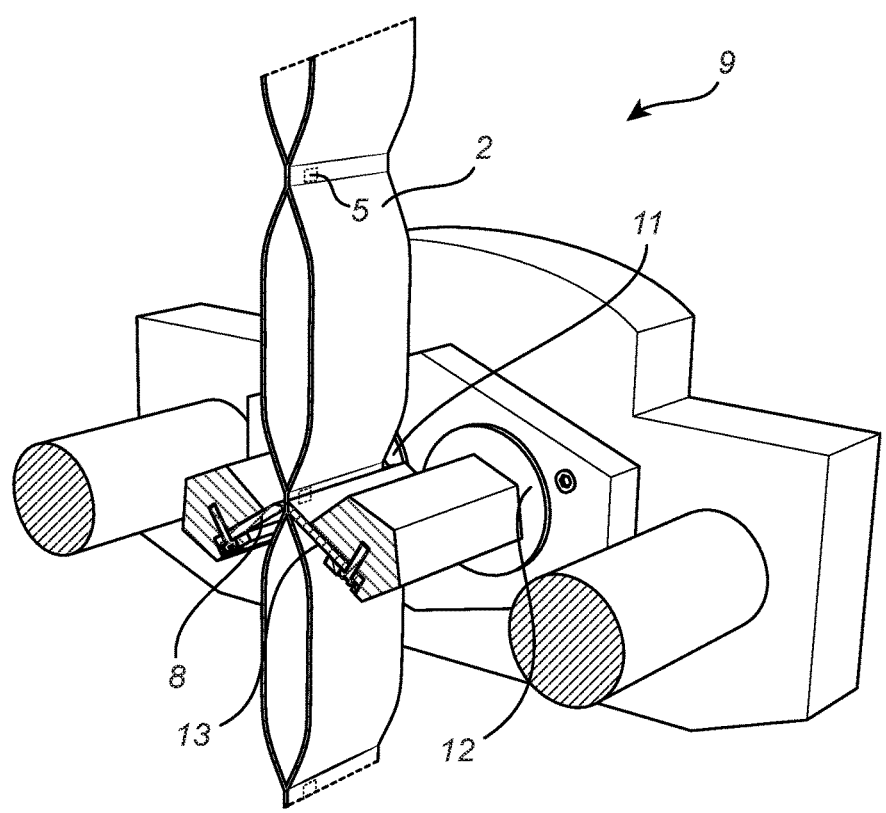
FIG. 3 is a cross section of the cutting unit in FIG. 2.

FIG. 2 and FIG. 3 illustrate a cutting unit 9 and a servo drive 10 connected to the cutting unit 9. This is one possible solution on how to drive, control and, if necessary, adjust the cutting knife 8 in relation to each package 2 passing though the filling machine 1. Here, as stated above, a complete cutting unit 9 is provided. The cutting unit 9 comprises a first gear wheel 11 and a second gear wheel 12 arranged opposite to the first gear wheel 11. The cutting knife 8 is connected to the first gear wheel 10 and an anvil 13 is connected to the second gear wheel 12. In turn, the first gear wheel 11 and the second gear wheel 12 are connected to the servo drive 10. The adjustment process of the cutting knife could for example be conducted according to the following. When the package 2 is transversely sealed in the jaw system 3, it is provided with a unique mark 5 by activating the magnetisable paint using the magnet 4 provided in one of the jaws 6 of the jaw system 3. Downstream thereof, the sensor 7 will read the unique mark 5 on the package 2 and send information about the same to the control unit. The control unit will then be able to calculate the positioning of the package 2 in the filling machine 1 based on the information received from the sensor 7. Thereafter, the control unit will send instructions to the servo drive 10 which in turn will adjust the first and second gear wheel 11, 12 accordingly so that the cutting knife 8 and the anvil 13 are properly aligned with the package 2 before it is cut away from the web of packaging material. In this example, the cutting knife 8 is in a fixed position with respect to the machine frame of the filling machine 1 and the rotation speed of the gear wheels 11, 12 are adjusted so as to synchronize the cutting knife 8 and the anvil 13 with the package 2.

It should be understood that the control or adjustment process of the cutting knife 8 may differ.

In another example, the cutting knife 8 is movable and thus adjustable in relation to the actual machine frame of the filling machine 1. It is understood that other variations in the present disclosure are contemplated and in some instances, some features of the disclosure can be employed without a corresponding use of other features. Accordingly, it is appropriate that the appended claims be construed broadly in a manner consistent with the scope of the disclosure.

For instance, the sensor may be a magnetic sensor. Naturally, the components described above and comprised in the filling machine may be varied and have any suitable size and shape.

The cutting knife may be part of a complete cutting unit but other possibilities are also possible. The cutting knife alone could for example be directly connected of a drive means which would control the same based on information received from the control unit.

The invention claimed is:

1. A filling machine for filling a package of a web of packaging material with a food product, comprising:
    a jaw system configured to seal the package after being filled with the food product, the jaw system having a marking element configured to provide a unique mark on the package;
    a sensor arranged downstream of the jaw system and configured to detect the mark on the package; and
    a cutting knife configured to cut the package from the web of packaging material and configured, before cutting the package from the web of packaging material, to move to a first position relative to the package based on the mark detected by the sensor, the cutting knife being arranged on a movable part of the filling machine that is movable in a first direction for cutting the package and in a second direction in relation to a frame of the filling machine for adjusting in relation to the package;
    wherein the marking element comprises a magnet configured to provide the mark on the package by interacting with a magnetizable medium on the package, and wherein the sensor is a magnetic sensor that is configured to sense the mark on the package by detecting the magnetizable medium.

2. The filling device according to claim 1, wherein the marking element is part of a jaw of the jaw system.

3. The filling machine according to claim 1, further comprising a control unit connected to the sensor and to the cutting knife, wherein the control unit is configured to adjust a position of the cutting knife based on information received from the sensor.

4. The filling machine according to claim 1, further comprising a gear wheel connected to the cutting knife and configured to adjust the cutting knife upon rotation of the gear wheel.

5. The filling machine according to claim 4, further comprising a servo drive connected to the gear wheel that controllably rotates the gear wheel during a cutting operation.

6. The filling machine according to claim 1, further comprising a cutting unit, the cutting unit comprising a first gear wheel and a second gear wheel arranged opposite to the first gear wheel, wherein the cutting knife is connected to the first gear wheel and an anvil is connected to the second gear wheel, wherein the cutting occurs when the web of packaging material is between the cutting knife and the anvil.

7. The filling machine according to claim 6, further comprising a servo drive, connected to the first gear wheel and the second gear wheel, that controllably rotates the first and second gear wheels during a cutting operation.

8. The filling machine according to claim 1, wherein the cutting knife is adjusted in relation to the package before cutting the web of packaging material.

9. The filling machine according to claim 1,
wherein the web of packaging material moves from an upstream location to a downstream location,
wherein the cutting knife is rotatable and is configured to cut the package from the web of packaging material when the cutting knife is rotated to a cutting position, and
wherein the filling machine further comprises a control unit configured to determine, based on the mark detected by the sensor, a position of the package relative to the cutting knife, wherein the control unit is configured to adjust, prior to cutting of the package from the web of packaging material, a rotational speed of the cutting knife in order to align the cutting knife at the cutting position with the package.

* * * * *